US009032282B2

(12) United States Patent
Kummer

(10) Patent No.: US 9,032,282 B2
(45) Date of Patent: May 12, 2015

(54) METHOD AND WEB CONTENT MANAGEMENT SYSTEM FOR A/B TESTING OR MULTIVARIATE TESTING OF WEBSITES ON COMPUTERS BEING CONNECTED TO A WEB CONTENT MANAGEMENT SYSTEM

(71) Applicant: Coremedia AG, Hamburg (DE)

(72) Inventor: Olaf Kummer, Halstenbek (DE)

(73) Assignee: Coremedia AG, Hamburg (DE)

( * ) Notice: Subject to any disclaimer, the term of this patent is extended or adjusted under 35 U.S.C. 154(b) by 0 days.

(21) Appl. No.: 13/857,476

(22) Filed: Apr. 5, 2013

(65) Prior Publication Data

US 2013/0268841 A1 Oct. 10, 2013

(30) Foreign Application Priority Data

Apr. 5, 2012 (EP) ..................................... 12163380

(51) Int. Cl.
| | | |
|---|---|---|
| G06F 17/00 | (2006.01) | |
| G06F 17/22 | (2006.01) | |
| G06F 11/36 | (2006.01) | |

(52) U.S. Cl.
CPC ........ G06F 17/2247 (2013.01); G06F 11/3672 (2013.01)

(58) Field of Classification Search
CPC .......... G06F 17/3089; G06F 17/30893; G06F 17/30896; G06F 17/2247
USPC ...................................................... 715/205
See application file for complete search history.

(56) References Cited

U.S. PATENT DOCUMENTS

| | | | | |
|---|---|---|---|---|
| 8,090,703 B1 * | 1/2012 | Agarwal et al. | ................ | 707/707 |
| 8,296,643 B1 * | 10/2012 | Vasilik | ........................... | 715/200 |
| 8,392,832 B2 * | 3/2013 | Arastafar | ...................... | 715/273 |
| 8,458,604 B2 * | 6/2013 | Lodico et al. | ................. | 715/760 |
| 8,689,117 B1 * | 4/2014 | Vasilik et al. | ................. | 715/760 |
| 8,839,093 B1 * | 9/2014 | Siroker et al. | ................ | 715/234 |
| 8,914,736 B2 * | 12/2014 | Cardasco | ...................... | 715/760 |

(Continued)

FOREIGN PATENT DOCUMENTS

| | | |
|---|---|---|
| EP | 2 420 965 A1 | 2/2012 |
| WO | WO 2007137278 A3 * | 5/2009 |

OTHER PUBLICATIONS

Nazir et al., A Mechanism for Mining Top Impacted Segments in Web Analytics based on the Variants used for AB Testing, Google 2014, pp. 66-71.*

(Continued)

*Primary Examiner* — Cong-Lac Huynh
(74) *Attorney, Agent, or Firm* — Oliff PLC

(57) ABSTRACT

A method and a system for A/B testing of a website on a computer being connected to a web content management system, wherein the method includes receiving, at the web content management system from a requesting computer, a webpage data request directed to a webpage of a website for which at least two website variants including a first website variant and a second website variant are defined, and selecting one website variant of the at least two website variants of the website. If the second website variant is selected, the method further includes creating, at the web content management system, first markup language representation data of the webpage, second markup language representation data of the webpage, and webpage difference data.

15 Claims, 6 Drawing Sheets

(56) References Cited

U.S. PATENT DOCUMENTS

| | | | |
|---|---|---|---|
| 2006/0162071 A1* | 7/2006 | Dixon et al. | 5/93.1 |
| 2009/0100154 A1* | 4/2009 | Stevenson et al. | 709/220 |
| 2009/0281989 A1 | 11/2009 | Shukla et al. | |
| 2010/0293486 A1* | 11/2010 | Baartse | 715/763 |
| 2011/0161825 A1 | 6/2011 | Tierney et al. | |
| 2012/0151329 A1* | 6/2012 | Cordasco | 715/234 |
| 2013/0326337 A1* | 12/2013 | Lehmann et al. | 715/236 |
| 2014/0109066 A1* | 4/2014 | Dhanda | 717/131 |
| 2014/0157112 A1* | 6/2014 | Miller | 715/237 |
| 2014/0172871 A1* | 6/2014 | Brayman et al. | 707/741 |
| 2014/0282049 A1* | 9/2014 | Lyon et al. | 715/744 |
| 2015/0007064 A1* | 1/2015 | Givoni | 715/760 |

OTHER PUBLICATIONS

Jul. 27, 2012 Extended European Search Report issued in European Application No. 12163380.4.

* cited by examiner

METHOD AND WEB CONTENT MANAGEMENT SYSTEM FOR A/B TESTING OR MULTIVARIATE TESTING OF WEBSITES ON COMPUTERS BEING CONNECTED TO A WEB CONTENT MANAGEMENT SYSTEM

The present invention relates to a method for A/B testing or multivariate testing of websites on computers being connected to a web content management system and a web content management system being configured to be connected to computers and being configured for A/B testing or multivariate testing of websites on computers being connected to the web content management system.

BACKGROUND OF THE INVENTION

A/B testing, also known as split testing, is a per se known method to test changes to a webpage design (sometimes referred to as version B), e.g. against a basic webpage design (sometimes referred to as version A), and to determine which webpage design among the available designed versions may produce the most positive results. If a version A is tested against a version B of the webpage, the term A/B testing is commonly used, and in case three or more versions are tested against each other, the term of multivariate testing is used.

Typically, different versions of webpages for the purpose of A/B testing or multivariate testing are defined on a markup language representation data level, e.g. on the level of an HTML code of the webpages, which makes it difficult to implement a functionality of A/B testing or multivariate testing into an object-oriented web content management system since such approaches depart from the abstract object-oriented management of data and rather corresponds to a management of webpages on the markup language representation level.

On the other hand, known web content management systems may be connected to one or more computers, e.g. via an internet connection, so as to provide a requesting computer, in response to a webpage data request, with the markup language representation data of a webpage so that the webpage can be displayed at the requesting computer on the basis of the markup language representation data received from the web content management system. Here, commonly, computers comprise browser means which are configured to process markup language representation data in order to display a webpage on the basis of the markup language representation data.

The invention however particularly relates to object-oriented web content management systems which store webpage/website content in the form of so-called objects (a website comprises one or more webpages), wherein an object-oriented web content management system may be configured to create markup language representation data on the basis of stored objects according to a webpage scheme which defines a structure of the webpage based on the content objects. Such web content management systems allow the providers of websites to define the structure and content of one or more webpages on the basis of content objects, i.e. at the object-oriented level, independently of actual markup language representation data which can be processed by a requesting computer.

SUMMARY OF THE INVENTION

In view of the above, it is an object of the present invention to provide an efficient and reliable configuration enabling a functionality of A/B testing or multivariate testing of websites on computers being connected to an object-oriented web content management system and to provide an object-oriented web content management system which efficiently and reliably provides such a functionality of A/B testing or multivariate testing of websites on computers being connected to the web content management system.

For solving the above-mentioned object of the present invention, there is proposed a method for A/B testing or multivariate testing of websites on computers being connected to a web content management system according to claim 1 and a web content management system according to claim 15. Dependent claims relate to preferred embodiments of the present invention.

A basic underlying idea of the invention is to define the differences between versions of webpages of websites for the purpose of A/B testing or multivariate testing at the object-oriented level on the basis of content objects rather than on the basis of markup language representations of the webpages such as e.g. at the level of HTML codes of the webpages.

This advantageously enables the convenient, efficient and reliable implementation of a functionality for A/B testing or multivariate testing into an object-oriented web content management system without the requirement of alternating between the object-oriented level and the markup language representation level when defining the A/B versions. By contradistinction thereto, in systems which may enable to define A/B versions on the markup language representation level (directly or by means of editing programs), when defining differences between versions on the markup language representation level, such differences inconveniently need to be transformed backwards to the object-oriented level at the time when they are to be included as permanent changes to the web site.

In addition, the A/B versions may be directly defined conveniently by the providers of the websites without particular knowledge about markup language representations and their requirements since the markup language representation data may still be reliably and efficiently be automatically created by rendering means of the web content management means.

Moreover, the definition of differences between different webpage versions for the purpose of A/B testing or multivariate testing at the object-oriented level provides the further non-obvious advantage that complete websites consisting of plural webpages may be consistently tested without high burden. Specifically, it is to be noted that differences between versions of webpages for A/B testing or multivariate testing may not only relate to different structure of the same objects but may further relate to changes in one or more objects. However, the same objects (such as text objects, image objects, combinations thereof, etc.) may occur or be referenced to in different webpages of the website. Defining the differences of objects at the object level leads to the advantageous effect that the changes will be automatically implemented in all affected webpages of the website by only once defining the change of the object. On the other hand, in common A/B testing methods, the differences of webpages are defined at the HTML-level (which is an example of a markup language representation-level) so that differences have to be defined for each single webpage, even if the same objects are affected.

Moreover, the definition of differences between different webpage versions for the purpose of A/B testing or multivariate testing at the object-oriented level provides the further non-obvious advantage that it can be more conveniently applied to dynamic websites which involve changes over time (such as e.g. news websites) when intended dynamic changes of the webpages of the websites occur even during A/B testing. Since the differences of testable versions are defined on the object-oriented level, editorial changes of the websites will also be made on the object-oriented level so that editorial changes and the differences of the versions due to A/B testing will be simultaneously applied when rendering the corresponding markup language representation data, without any inconvenient requirements for adapting the defined object-oriented variants and/or differences on the object-oriented level to the editorial changes.

When defining differences between versions on the markup language representation level as in common A/B testing techniques, the A/B testing cannot be easily applied to traditional web channels as well as mobile web channels, which may require slightly adapted webpage definitions. For example, today's mobile devices are typically provided with specially streamlined versions of webpages. However, in the content-object related approach of the present invention, A/B testing can be more conveniently applied also to different web channels such as traditional web channels and mobile web channels. For example, in A/B testing, in case differences between variants may be defined for content-objects, the same abstract data in the content-objects may then be rendered different for different devices and/or web channels according to the requirements but the defined differences of variants can be defined for the same content-object only once even for different devices and/or web channels. Accordingly, A/B testing can be efficiently and more conveniently applied to different devices and/or web channels.

According to a first aspect of the present invention, there may be provided a method for A/B testing or multivariate testing of websites on computers being connected to a web content management system. The computers may be connected to the web content management system via a wired or wireless network. Preferably, the web content management system may comprise one or more server computers and/or the computers may be connected to the web content management system and/or the server computers via an internet connection.

The invention relates to a functionality of A/B testing or multivariate testing of websites implemented into an object-oriented web content management system. The web content management system comprises storage means for storing website content data in the form of content objects and for storing one or more website variants which respectively define structures of one or more webpages of websites on the basis of stored content objects, and rendering means for creating markup language representation data of one or more webpages of websites on the basis of website variants and content objects indicated in the respective website variant and as e.g. stored in the storage means.

Accordingly, the underlying web content management system is an object-oriented web content management system which stores website content data in the form of content objects. Such a web content management system may be configured to receive a request directed to a webpage from a requesting computer and, in response to the request, the web content management system may be configured to create, at the web content management system, markup language representation data of the webpage on the basis of a stored website variant and content objects indicated by the website variant, to then provide the requesting computer with the markup language representation data of the webpage. The computer and, in particular a browser means of the computer, is then preferably configured to display one or more webpages on the basis of the received markup language representation data.

According to the first aspect of the present invention, the method comprises receiving, at the web content management system from a requesting computer connected to the web content management system, a webpage data request directed to a webpage of a website for which at least two website variants including a first website variant and a second website variant are defined or even already stored in the storage means of the web content management system (preferably for the purpose of A/B testing or multivariate testing of the website), and selecting one website variant of the at least two website variants of the website. Here, in case of A/B testing, the first website variant may relate to a version A of one or more webpages of the requested website and the second website variant may relate to a version B of one or more webpages of the requested website. On the other hand, in case of multivariate testing, the first website variant may relate to a first version of a plurality of versions of one or more webpages of the requested website and the second website variant may relate to a second version of a plurality of versions of one or more webpages of the requested website.

As mentioned above, website variants define structures of one or more webpages of websites on the basis of stored content objects. Accordingly, differences in website variants may include differences in structure of objects and/or differences in objects themselves. In case differences may be present in content objects, the present invention may further provide a functionality of the content management system according to which a user of the content management system, after performing A/B testing and having determined the more favorable webpage version, can select the favorable version, wherein the corresponding content-object(s) stored in the storage means of the content management system can be automatically changed on the basis of the defined differences.

It is to be further noted that the particular underlying selection process among the two or more available variants is not essential for the present invention, and any of the known selection criteria and/or selection processes may be used. Especially, the step of selecting one website variant of the at least two website variants of the website may be performed at the web content management system, at the requesting computer, or even at another computer or server connected to at least one of the web content management system and the requesting computer.

For example, statistical criteria and/or probability criteria may be defined specifying and/or indicating how often the first variant shall be displayed at the requesting computers in response to the webpage data request and/or how often the second variant shall be displayed at the requesting computers in response to the webpage data request, e.g. in terms of probabilities and/or displaying ratios.

For example, in case of A/B testing, the probability for displaying version A according to a first website variant may be defined as probability a ($0 \leq a \leq 1$) and the probability for displaying version B according to a second website variant may be defined as probability $b=1-a$. Then the selection process may be based e.g. on random number processes according to which a selecting means at the web content management system, at the requesting computer, or even at another computer or server connected to at least one of the web content management system and the requesting computer may generate a random number c ($0 \leq c \leq 1$), and if $c<a$, version A according to the first website variant may be selected, and if $c \leq a$, version B according to the second website variant may be selected in the step of selecting. Other techniques may be used as well.

In this connection, it is to be noted that the present invention is not particularly concerned with the A/B testing evaluations which may include the gathering of events or statistical figures that help in actually evaluating the relative benefits of the displayed A/B variants. Still, for evaluating which variant is more successful, according to embodiments of the invention, evaluation data may be sent back to the content management system from the requesting computer. The requesting computer may report events such as a purchase by the user on an online shop webpage or the activation of specific links on the webpage etc.

Moreover, in case the selection of the variant is performed on the side of the requesting computer, the requesting computer may report the selection back to the content management system. Then, it may be more efficient to report the choice of variant A or B only when the variant is tested positively, for example, when the website visitor of an online shop website makes a purchase or activates a specific link. If in that case (positive test) the percentage of visitors seeing variant B is 60% and the selection mean of the requesting computer are known to use variant B in 50% of the cases, this would be a sufficient indicator that variant B is preferable although the requesting computer does not report back the selected variant for every webpage request. Still, the number of purchases might be some orders of magnitude lower than the number of webpage requests, thereby creating significantly lower load. Even if the effort required for gathering the events or statistical figures cannot be reduced, it might still be helpful to reduce the load on the webserver, because it helps these servers to perform robustly in the presence of unusually high load. In such cases it is generally acceptable if the test appliance receives a limited data set but not if website visitors are presented with an unresponsive or defect website. Of course, other evaluation criteria may be used as well, such as e.g. when the duration of the visit of the webpage is measured. Then, in case the requesting computer makes the selection of the variant, every webpage request needs to be reported back to the content management system for the purpose of A/B testing evaluations.

According to the first aspect of the present invention, if the first website variant is selected in the step of selecting, the method may further comprise creating, at the web content management system, first markup language representation data of the webpage on the basis of the first website variant and content objects indicated by the first website variant, and/or providing the requesting computer with the first markup language representation data of the webpage.

On the other hand, if the second website variant is selected, the method further comprises creating, at the web content management system, first markup language representation data of the webpage on the basis of the first website variant and content objects indicated by the first website variant; creating, at the web content management system, second markup language representation data of the webpage on the basis of the second website variant of the website and content objects indicated by the second website variant; and determining, at the web content management system, differences between the created first and second markup language representations of the webpage.

Accordingly, according to one of the main features of the present invention, the present invention does not consider to present the requesting computer directly with second markup language representation data, if the second website variant is selected, but to automatically create efficiently and reliably the first and second markup language representation data on the basis of the object-oriented website variants and the therein indicated content objects and, then, to compare the created first and second markup language representation data, and to determine differences between first and second markup language representation data on the markup language representation level still at the web content management system.

Furthermore, according to the first aspect of the present invention, the method further comprises, in case the second website variant is selected, creating, at the web content management system, webpage difference data on the basis of the determined differences, the created webpage difference data indicating the differences between the first and second markup language representation data of the webpage; and providing the requesting computer with the first markup language representation data of the webpage; and providing the requesting computer with the created webpage difference data for post-processing of the first markup language representation at the requesting computer on the basis of the webpage difference data. This provides the advantage that the differences of between the variants do not need to be defined on the level of the markup language representation (such as e.g. at an HTML-level as is the case in known methods for A/B testing) but the differences may conveniently be defined on an object-oriented level in the object-oriented web content management system by defining different website variants that define a structure of the webpages on the basis of stored content objects.

According to one of the main features of the present invention, the present invention does not consider to present the requesting computer directly with second markup language representation data, if the second website variant is selected, but to provide the requesting computer with the first markup language representation data of the webpage with the created webpage difference data so that the requesting computer may be configured to display the one or more webpages of the second website on the basis of the first markup language representation data of the webpage and the created webpage difference data after post-processing of the first markup language representation on the basis of the webpage difference data at the requesting computer.

According to a preferred aspect of the invention, if the first website variant is selected, the method preferably further comprises displaying, at the requesting computer, the webpage corresponding to the first markup language representation data on the basis of the first markup language representation data. On the other hand, if the second website variant is selected, the method preferably further comprises displaying, at the requesting computer, the webpage corresponding to the second markup language representation data on the basis of the as first markup language representation data being preferably post-processed on the basis of the webpage difference data. Accordingly, the actual second version of the webpage is created at the requesting computer on the basis of the transmitted first markup language representation data corresponding to the first variant of the webpage by post-processing the first markup language representation data on the basis of the received webpage difference data.

According to a further preferred aspect of the invention, the web content management system preferably further comprises selecting means for selecting one of the at least two website variants of the website, wherein selecting one website variant of the at least two website variants of the website is preferably performed by the selecting means of the web content management system upon receiving from the requesting computer the webpage data request. This allows to perform the selection of the website variant to be performed at the web content management system, wherein the selection may be performed upon or in response to receiving the webpage data request directed to one or more webpages for which different variants for the purpose of A/B testing or multivariate testing are available.

According to a preferred aspect of the invention, the method preferably further comprises providing the requesting computer with scripting language data comprising instructions for post-processing of the first markup language representation data at the requesting computer. This has the advantage that the requesting computer can be efficiently and conveniently provided with instructions for the post-processing to be performed at the side of the requesting computer, e.g. instructions for the post-processing of the first markup language representation at the requesting computer on the basis of received webpage difference data. Scripting language data may be data which is processable by scripting language processing means at the requesting computer, e.g. scripting language processing means for processing the generation of markup language representations (e.g. HTML generation, e.g. by means of DHTML which is relating to a dynamical generation of HTML) and/or for processing modification commands provided in a scripting language such as e.g. JavaScript or other suitable scripting languages.

The instructions included in the scripting language data may particularly preferably include an instruction to request webpage difference data, i.e. instructing the requesting computer to issue a webpage difference data request. Further preferably, creating second markup language representation data of the webpage is then performed upon receiving a webpage difference data request from the requesting computer directed to the webpage. That is, creating webpage difference data only needs to be performed at the side of the web content management system upon or in response to receiving the webpage difference data request from the requesting computer.

Further preferably, the web content management system further comprises selecting means for selecting one of the at least two website variants of the website. Then, selecting one website variant of the at least two website variants of the website may be preferably performed by the selecting means of the web content management system upon or in response to receiving from the requesting computer the webpage difference data request.

Further preferably, if the first website variant is selected, the method may further comprise providing, upon receiving from the requesting computer the webpage difference data request, the requesting computer with webpage difference data indicating that no post-processing of the first markup language representation at the requesting computer is required.

This advantageously enables a configuration in which the selection is conveniently performed at the web content management system after receipt of a webpage difference data request. Since the selection may have the result that the first variant is selected for which the first markup language representation data has already been transmitted to the requesting computer and no further post-processing may be required, but the requesting computer may still wait for a response to the webpage difference data request for post-processing of the first markup language representation data, the web content management system may conveniently send webpage difference data indicating that no post-processing of the first markup language representation at the requesting computer is required so as to inform the requesting computer that it may display or continue displaying the web page according to the first variant without post-processing on the basis of the first markup language representation data.

Further preferably, if the second website variant is selected, providing the requesting computer with the created webpage difference data indicating the differences between the first and second markup language representation data of the webpage is preferably performed upon or at least in response to receiving from the requesting computer the webpage difference data request. This enables the requesting computer to post-process the previously received first markup language representation on the basis of the webpage difference data without requiring to send the complete second markup language representation data so as to advantageously reduce transmission traffic. In addition, the web content management system may include scripting language data including instructions for the post-processing or even additional instructions for the post-processing if instructions have been previously received at the requesting computer.

According to an alternative or additionally provided preferred aspect of the invention, the requesting computer may comprise selecting means for selecting one of the at least two website variants of the website. This advantageously allows to perform the selection at the requesting computer which allows to efficiently reduce the processing at the web content management system since the web content management system typically handles a huge amount of webpage data requests from different requesting computers simultaneously or at least within a short period of time, while the respective requesting computers do typically handle the issuance of only few webpage data request simultaneously or at least within a short period of time.

In the above aspect, if the second website variant is selected, the method preferably further comprises issuing, at the requesting computer, a webpage difference data request directed to the second website variant.

This preferred aspect advantageously enables to efficiently inform the web content management system of the selection and drastically helps to reduce the processing burden at the web content management system, since no further processing at the web content management system may be required if the first website variant is selected at the requesting computer because no webpage difference data request may be issued to the requesting computer in this case. If however the second website variant is selected, the web content management system may be informed that the second website variant is selected via the webpage difference data request so that the web content management system may perform the steps of creating the second markup language representation data and the webpage difference data.

Accordingly, further preferably, providing the requesting computer with the created webpage difference data indicating the differences between the first and second markup language representation data of the webpage is preferably performed upon or at least in response to receiving, from the requesting computer, the webpage difference data request directed to the second website variant.

According to a preferred aspect of the invention, the method may comprise defining the first website variant of the website and/or the second website variant on the basis of content objects stored in the storage means. Specifically, the method may comprise storing the first website variant of the website and/or the second website variant on the basis of content objects in the storage means. According to this preferred aspect, it is advantageously enabled to define the different website variants on the object-oriented level by storing different website variants in the storage means, the different website variants defining the structure of the different website versions at an object-oriented level on the basis of stored content objects. That is, the provider of the website does not need to deal with defining the differences on a markup language level, e.g. at the level of the HTML code, but can define the differences and different versions to be tested at the convenient and more intuitive object-oriented level.

According to a preferred aspect of the invention, the method may further comprise defining the first website variant of the website on the basis of content objects stored in the storage means, defining at least one difference between the first website variant and the second website variant on the basis of content objects stored in the storage means, and/or creating the second website variant on the basis of the first website variant and the at least one difference between the first website variant and the second website variant. In particular, the method may comprise storing the first website variant of the website on the basis of content objects in the storage means, storing at least one difference between the first website variant and the second website variant on the basis of content objects in the storage means, and/or storing data indicating the second website variant on the basis of the first website variant and the at least one difference between the first website variant and the second website variant.

This provides the advantage again that the provider of the website does not need to deal with defining the differences on a markup language level, e.g. at the level of the HTML code, but can define the differences and different versions to be tested at the convenient and more intuitive object-oriented level. In addition, this provides the significant advantage that the provider of the website does not need to define all website versions as a whole, i.e. a complete website variant for each website version to be tested, but the website provider may define only one whole website variant (e.g. for a basic website version) and other versions may only be defined on the basis of the differences compared to the basic website version in a very efficient way.

This provides the additional significant advantage that further versions can be automatically tested without being actually defined by the provider. For example, if one main version is defined as a first variant and two other website variants shall be defined by their respective differences compared to the main version, automatically combining the defined differences enables to automatically create a fourth website variant for a fourth website version in a very efficient way.

Accordingly, further preferably, the plurality of website variants further include a third and a fourth website variant, wherein the method may further comprise defining at least one difference between the first website variant and the third website variant on the basis of content objects stored in the storage means, creating the third website variant on the basis of the first website variant and the at least one difference between the first website variant and the third website variant, and/or creating the fourth website variant on the basis of the first website variant, the at least one difference between the first website variant and the second website variant, and the at least one difference between the first website variant and the third website variant.

According to a preferred aspect of the invention, the method may further comprise defining the first website variant of the website on the basis of content objects stored in the storage means, defining a plurality of differences between the first website variant and a third website variant on the basis of content objects stored in the storage means, and/or creating the second website variant on the basis of the first website variant and a subset of differences of the plurality of defined differences between the first website variant and the third website variant. In particular, the method may further comprise storing the first website variant of the website on the basis of content objects in the storage means, storing a plurality of differences between the first website variant and a third website variant on the basis of content objects in the storage means, and/or creating the second website variant on the basis of the first website variant and a subset of differences of the plurality of defined differences between the first website variant and the third website variant.

This also efficiently makes it possible to automatically create plural testable versions by defining only one alternative version by providing (possibly only) one complete first website variant stored in the storage means and defining one alternative version on the basis of plural distinct differences on the object-oriented level, i.e. on the basis of a set of differences in website structure defined on the basis of the content objects. It then becomes possible to automatically create another version by combining only a subset of the set of defined differences and automatically create language representation data on the basis of the website variant of the main version and the subset of differences.

Further preferably, if the second website variant is selected, the one or more differences included in the subset are preferably selected, at the web content management system, upon or at least in response to receiving from a requesting computer a request directed to the webpage.

According to a preferred aspect of the invention, the method may further comprise storing the first markup language representation data, the second markup language representation data, the webpage difference data and/or scripting language data in a cache memory of the web content management system. This helps to make the performance of the web content management system even more efficient since, for later requests once the respective data has been created already previously, the first markup language representation data, the second markup language representation data and/or the webpage difference data can be quickly retrieved from the cache memory.

Further preferably, the method may further comprise removing the first markup language representation data, the webpage difference data and/or scripting language data stored in the cache memory of the web content management system, when one or more content objects indicated by the first website variant are changed, and/or removing the second markup language representation data and/or the webpage difference data stored in the cache memory of the web content management system, when one or more content objects indicated by the second website variant are changed.

According to another preferred aspect, the method may further comprise removing the first markup language representation data, the second markup language representation data, the webpage difference data and/or scripting language data stored in the cache memory of the web content management system, when one or more defined differences are changed.

The above aspects of removing data from the cache memory advantageously enable to appropriately, dynamically and automatically adapt the contents stored in the cache memory in case the provider of the website changes one or more of the website variants during A/B testing or multivariate testing. Namely, if changes are performed on the object-oriented level by the provider of the webpage, the web content management system advantageously is enabled to automatically remove the potentially affected data on the markup language level from the cache memory so that the next request will reliably be processed by providing newly created markup language representation data and/or webpage difference data at the markup language representation level. The newly created data on the markup language representation level may be again stored conveniently in the cache memory until another change(s) is/are performed by the provider at the object-oriented level.

According to a preferred aspect of the invention, the first markup language representation data and/or the second markup language representation data preferably comprises HTML code of the webpage or even corresponds to a HTML code representation of the webpage.

According to a preferred aspect of the invention, the first and second markup language representation data is preferably further represented by Document Object Models stored in the storage means, differences between website variants of the website being preferably defined on the basis of differences in a structure of Document Object Models.

According to a preferred aspect of the invention, the content objects may comprise text document data objects, image data objects and/or objects relating to combinations of text document data and image data.

According to a preferred aspect of the invention, in selecting one website variant, upon receiving the request directed to the webpage from the requesting computer within a predetermined time period after having received already an earlier request directed to the webpage from the requesting computer, the same website variant is preferably selected as having been selected upon receiving the earlier request. This has the advantage that a requesting computer which issues a request directed to the webpage within a predetermined time period after having issued already an earlier request directed to the same webpage can be reliably be provided with the same data necessary to display the same webpage version as before in order to avoid confusion of a user who wishes to visit the webpage due to the so subsequent displaying of different versions.

According to a second aspect of the present invention, there is proposed a web content management system configured to be connected to computers and configured for A/B testing or multivariate testing of websites on computers being connected to the web content management system according to a method according to at least one of the before-described aspects or preferred aspects. For advantages of the web content management system, please refer to the above advantages of the corresponding method(s).

The web content management system comprises according to the second aspect comprises storage means for storing website content data in the form of content objects and for storing website variants which define structures of websites on the basis of stored content objects; rendering means for creating markup language representation data of one or more webpages of websites on the basis of website variants and content objects stored in the storage means; and markup language representation difference determining means for determining differences between the markup language representations of webpages.

The web content management system is configured to receive, from a requesting computer connected to the web content management system, a webpage data request directed to a webpage of a website for which at least two website variants including a first website variant and a second website variant are stored in the storage means of the web content management system for the purpose of A/B testing or multivariate testing of the website.

For the case that the first website variant is selected at the requesting computer or by selecting means for selecting one of the at least two website variants of the website being comprised in the web content management system, the rendering means is configured to create, at the web content management system, first markup language representation data of the webpage on the basis of the first website variant and content objects indicated by the first website variant, and the web content management system is configured to provide the requesting computer with the first markup language representation data of the webpage.

On the other hand, for the case that the second website variant is selected at the requesting computer or by selecting means for selecting one of the at least two website variants of the website being comprised in the web content management system, the rendering means is configured to create, at the web content management system, first markup language representation data of the webpage on the basis of the first website variant and content objects indicated by the first website variant, the rendering means is configured to create, at the web content management system, second markup language representation data of the webpage on the basis of the second website variant of the website and content objects indicated by the second website variant, the markup language representation difference determining means is configured to determine, at the web content management system, differences between the created first and second markup language representations of the webpage, the rendering means is configured to create, at the web content management system, webpage difference data on the basis of the determined differences, the created webpage difference data indicating the differences between the first and second markup language representation data of the webpage, the web content management system is configured to provide the requesting computer with the first markup language representation data of the webpage, and the web content management system is configured to provide the requesting computer with the created webpage difference data for post-processing of the first markup language representation at the requesting computer on the basis of the webpage difference data.

According to a third aspect of the invention, there is proposed a computer program product comprising program means, preferably stored on a medium processable by a computing device, which is enabled to cause, in response to a webpage data request from a requesting computer, a web content management system which comprises according to the second aspect comprises storage means for storing website content data in the form of content objects and for storing website variants which define structures of websites on the basis of stored content objects; rendering means for creating markup language representation data of one or more webpages of websites on the basis of website variants and content objects stored in the storage means; and markup language representation difference determining means for determining differences between the markup language representations of webpages to execute the steps of a method according to at least one of the above aspects.

Summarizing the above, the present invention provides an efficient and reliable configuration enabling a functionality of A/B testing or multivariate testing of websites on computers being connected to an object-oriented web content management system and an object-oriented web content management system which efficiently and reliably provides such a functionality of A/B testing or multivariate testing of websites on computers being connected to the web content management system.

Features, components and specific details of the above-described aspects and preferred aspects of the present invention may be exchanged or combined to form further preferred aspects optimized for the respective application. As far as those modifications are readily apparent for an expert skilled in the art, they shall be disclosed implicitly by the above description without specifying explicitly every possible combination, for the sake of conciseness of the present description.

DETAILED DESCRIPTION OF THE FIGURES AND OF PREFERRED EMBODIMENTS OF THE PRESENT INVENTION

In the following, the underlying concepts of the present invention will be described in detail with reference to figures and, furthermore, preferred embodiments of the present invention will be described. The present invention is, however, not limited to the below described embodiments of the present invention. The scope of the present invention is defined in the independent claims and by the scope thereof.

Figure 1:
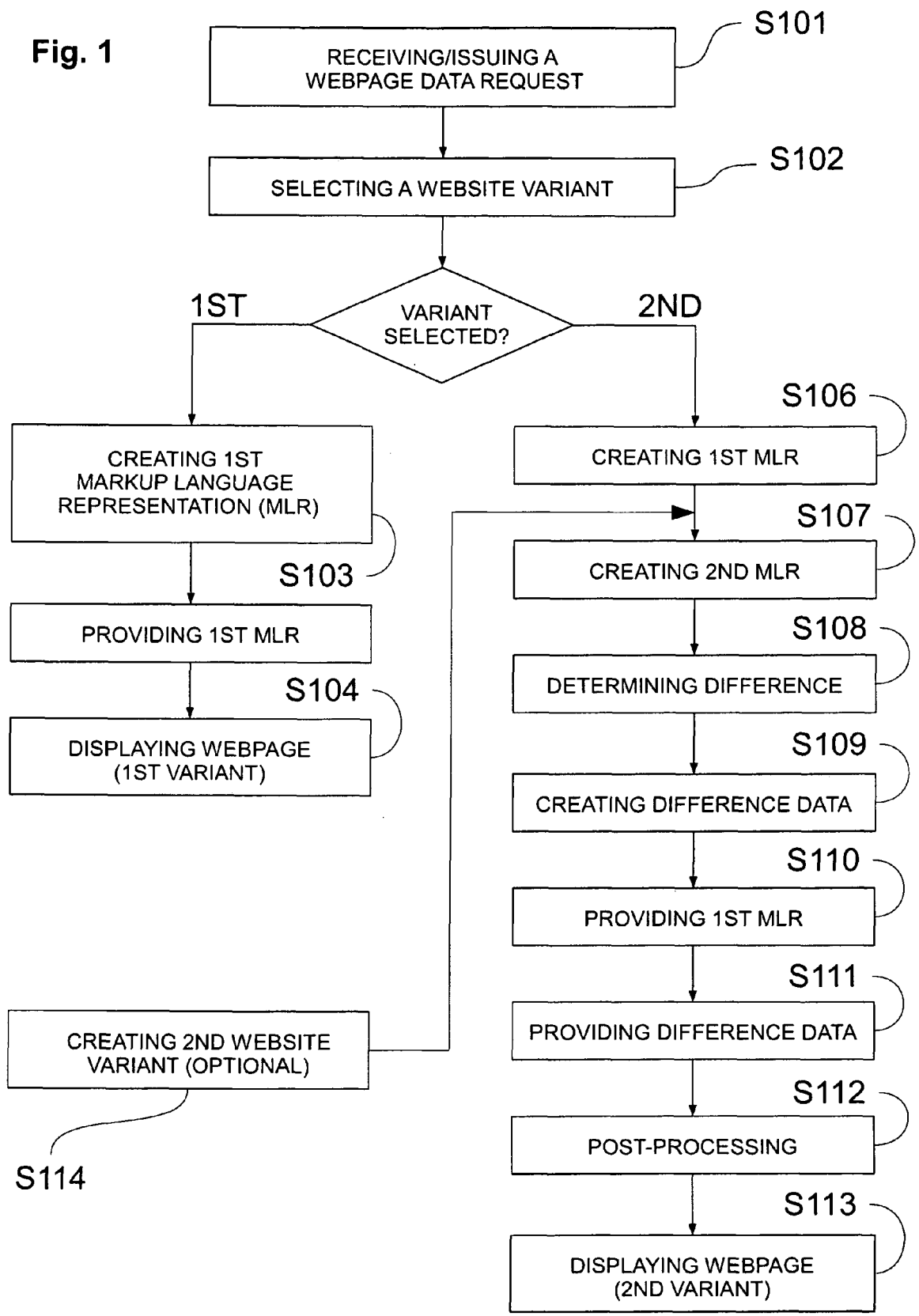
FIG. 1 exemplarily shows a flow chart illustrating a method for A/B testing or multivariate testing of websites on computers being connected to a web content management system according to a first embodiment of the present invention.

FIG. 1 exemplarily shows a flow chart illustrating a method for A/B testing or multivariate testing of websites on computers being connected to a web content management system according to a first embodiment of the present invention. The method for A/B testing or multivariate testing of a website on a computer 201 being connected to a web content management system 100 as shown in FIG. 1 is applicable to a web content management system 100 which comprises storage means 110 for storing website content data in the form of content objects and for storing one or more website variants, and rendering means 120 for creating markup language representation data of one or more webpages on the basis of a website variant and content objects indicated by the website variant. A preferred embodiment of such a web content management system is illustrated in connection with FIG. 6 described below.

A website variant defines a structure of one or more webpages of a website on the basis of stored content objects at the object-oriented level. Content objects may relate to text objects, image objects and/or objects combining images, combining texts or even combining text and images. For example, a webpage may have a structure combining different text objects and different image objects and the structure may be described on an object-oriented level e.g. as a structure tree of the involved image objects and text objects. Image objects may include images, video objects, photos etc. and text objects may include articles, text passages, headlines, links etc. The definition of a website variant indicating the structure of a website on the object-oriented level based on content objects is different from the browser-processable markup language representation such as e.g. a HTML representation.

As shown in FIG. 1, according to the first embodiment, the method comprises steps of receiving S101, at the web content management system 100 from a requesting computer 201, a webpage data request directed to a webpage of a website for which at least two website variants including a first website variant and a second website variant are defined (of course, from the view point of the requesting computer 201, the step 101 corresponds to a step of issuing the webpage data request directed to the webpage of the website), and selecting S102 one website variant of the at least two website variants of the website. It is to be noted that the step of selecting may be performed at the web content management system side or the requesting computer side or even at a different computing means being connected to at least one of the web content management system and the requesting computer.

As previously mentioned under the section Summary of the Invention, it is to be noted that the particular underlying selection process among the two or more available variants is not essential for the present invention, and any of the known selection criteria and/or selection processes may be used. Especially, the step of selecting one website variant of the at least two website variants of the website may be performed at the web content management system, at the requesting computer, or even at another computer or server connected to at least one of the web content management system and the requesting computer.

For example, statistical criteria and/or probability criteria may be defined specifying and/or indicating how often the first variant shall be displayed at the requesting computer in response to the webpage data request and/or how often the second variant shall be displayed at the requesting computer in response to the webpage data request, e.g. in terms of probabilities and/or displaying ratios. For example, in case of A/B testing, the probability for displaying version A according to a first website variant may be defined as probability a ($0 \leq a \leq 1$) and the probability for displaying version B according to a second website variant may be defined as probability $b=1-a$. Then the selection process may be based e.g. on random number processes according to which a selecting means at the web content management system, at the requesting computer, or even at another computer or server connected to at least one of the web content management system and the requesting computer may generate a random number c ($0 \leq c \leq 1$), and if $c<a$, version A according to the first website variant may be selected, and if $c \geq a$, version B according to the second website variant may be selected in the step of selecting. Other techniques may be used as well.

According to the first embodiment, it is selected in step S102 which website version shall be displayed at the requesting computer by selecting one of the first and second website variant. If the first website variant is selected, the method further comprises the steps of creating S103, at the web content management system 100, first markup language representation data of the webpage on the basis of the first website variant and content objects indicated by the first website variant, and providing S104 the requesting computer 201 with the first markup language representation data of the webpage. Then, the method continues with the step of displaying S105, at the requesting computer 201, the webpage corresponding to the first markup language representation data on the basis of the first markup language representation data, i.e. the first version of the webpage is displayed to the user at the requesting computer 201.

On the other hand, if the second website variant is selected in step S102, the method further comprises steps of creating S106, at the web content management system 100, first markup language representation data of the webpage on the basis of the first website variant and content objects indicated by the first website variant, creating S107, at the web content management system 100, second markup language representation data of the webpage on the basis of the second website variant of the website and content objects indicated by the second website variant, and determining S108, at the web content management system 100, differences between the created first and second markup language representations of the webpage. That is, the differences between versions of websites are then determined on the markup language representation level, e.g. as differences between different HTML codes of the website versions.

After the determination of the differences at the markup language representation level, the method continues with steps of creating S109, at the web content management system 100, webpage difference data on the basis of the determined differences. Here, the created webpage difference data indicates the differences between the first and second markup language representation data of the webpage and, then, the requesting computer 201 is provided in step S110 with the first markup language representation data of the webpage and in step S111 with the created webpage difference data for post-processing of the first markup language representation at the requesting computer (201) on the basis of the webpage difference data. The message to the requesting computer including the created webpage difference data may include further commands for the post-processing of the webpage(s) on the basis of the difference data, and may for this purpose include scripting language data that is data which is processable by scripting language processing means at the requesting computer, e.g. scripting language processing means for processing the generation of markup language representations (e.g. HTML generation, e.g. by means of DHTML which is relating to a dynamical generation of HTML) and/or for processing modification commands provided in a scripting language such as e.g. JavaScript or other suitable scripting languages At the requesting computer 201, the method then continues with the step S112 of post-processing of the first markup language representation on the basis of the received webpage difference data, e.g. by creating the second markup language representation on the basis of the first markup language representation on the basis of the received webpage difference data or by adapting the first markup language representation on the basis of the received webpage difference data. Finally, in step S113, the method continues with displaying, at the requesting computer 201, the webpage corresponding to the second markup language representation data on the basis of the first markup language representation data being post-processed on the basis of the webpage difference data.

The first and second website variants may be already stored in the storage means 110 of the web content storage system 100. Alternatively, only the first website variant may be already stored in the storage means 110 and the method may additionally comprise the optional step of creating S114 the second website variant. This may be achieved for example by the following aspects.

According to one aspect, the first website variant of the website and variant difference data indicating at least one difference between the first website variant and the second website variant may be already stored in the storage means 110, and, if the second website variant is selected, the method further comprises the optional step of creating (step S114), at the web content management system 100, the second website variant on the basis of the first website variant and the at least one difference between the first website variant and the second website variant. Accordingly, the second variant can be conveniently be defined on the basis of differences to the first variant at the object-oriented level.

This advantageously even allows to automatically create additional variants on the basis of a combination of independently defined differences. For example, variant difference data indicating at least one difference between the first website variant and a third website variant may be stored in the storage means, and the method may further comprise creating, at the web content management system 100, the third website variant on the basis of the first website variant and the at least one difference between the first website variant and the third website variant. A fourth website variant may then be conveniently be automatically created on the basis of the first website variant, at least one difference between the first website variant and the third website variant, and at least one difference between the first website variant and the second website variant, without being directly defined as a whole and without being directly defined by the differences between the first website variant and the fourth website variant.

According to another aspect, the first website variant of the website and a plurality of differences between the first website variant and a third website variant may be stored in the storage means, and the optional step of creating S114, at the web content management system 100, the second website variant may be performed automatically on the basis of the first website variant and a subset of differences of the plurality of stored differences between the first website variant and the third website variant.

It is to be noted that the step of selecting S102 the website variant for selecting the webpage version to be displayed among the available versions in the method according to the first embodiment may be performed at the requesting computer 201 or at the web content management system 100. If the selection is performed at the requesting computer 201, the web content management system 100 may send a message to the requesting computer 201 upon receiving the webpage data request directed to a webpage of a website for which at least two website variants are available so that the requesting computer 201 can perform the selection on the basis of the message and send a response message to the web content management system 100.

Figure 2:
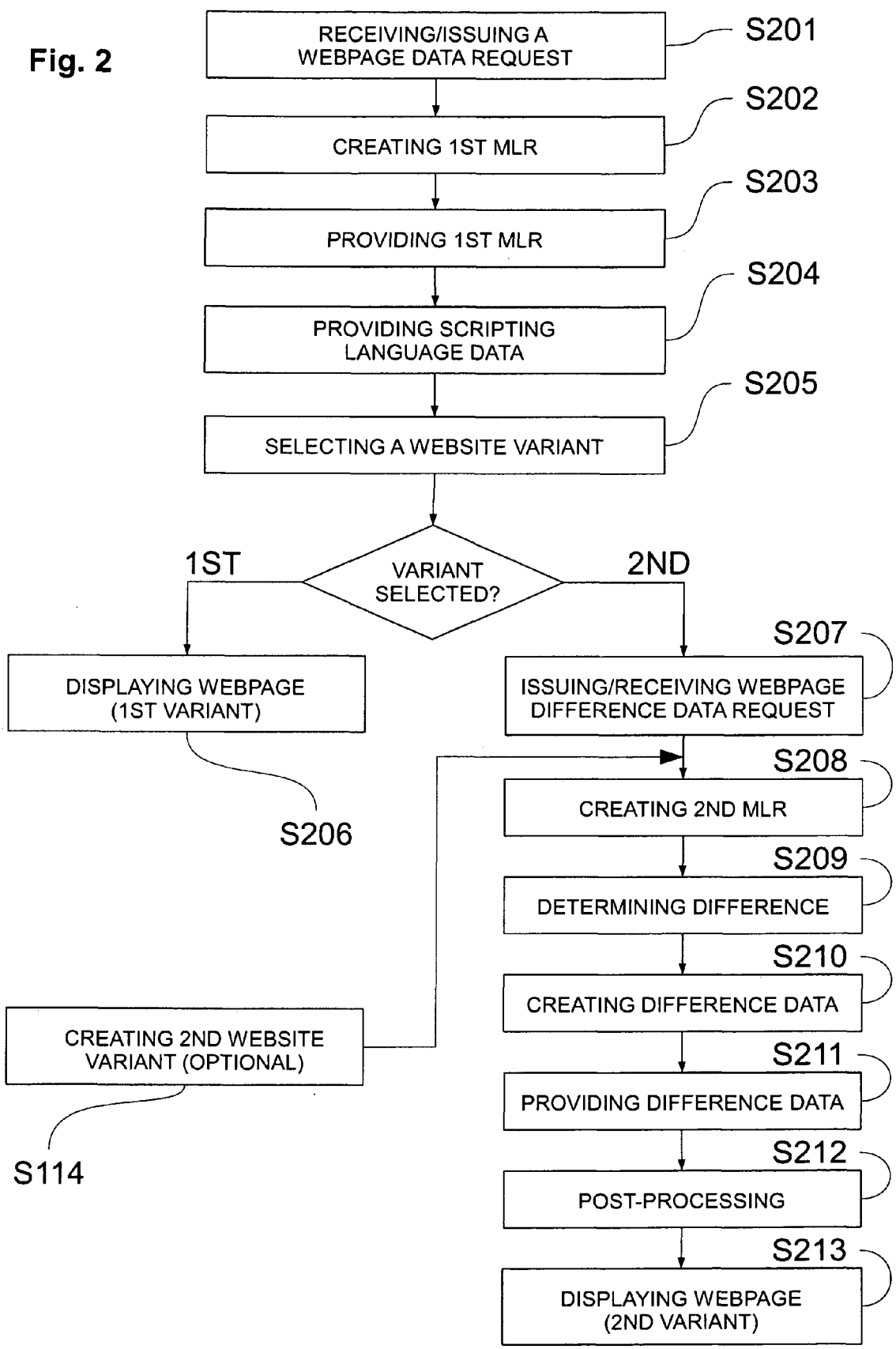
FIG. 2 exemplarily shows a flow chart illustrating a method for A/B testing or multivariate testing of websites on computers being connected to a web content management system according to a second embodiment of the present invention.

FIG. 2 exemplarily shows a flow chart illustrating a method for A/B testing or multivariate testing of websites on a computer 201 being connected to a web content management system 100 according to a second embodiment of the present invention.

Similar to the method of FIG. 1, the method according to FIG. 2 comprises the steps of receiving/issuing a webpage data request (step S201) and selecting the website variant (step S205). However, in difference to FIG. 1, prior to the step of selecting the website variant in step S205, the steps of creating the first markup language representation data (step 202) and providing the first markup language representation data to the requesting computer 201 (step 203) are performed. It is to be noted that such modification of the method of FIG. 1 can be performed also independently without the additional modifications described below.

In addition, as a further modification of the method of FIG. 1, the method of FIG. 2 further includes a step of providing the requesting computer 201 with scripting language data, wherein the scripting language data comprises instructions for the requesting computer 201 for the post-processing of the received first markup language representation data at the requesting computer 201. For example, the method of FIG. 2 is particularly advantageous for an implementation in which the selection step S205 is performed by a selecting means at the requesting computer 201.

Then, the scripting language data may comprise instructions informing the requesting computer 201 that at least a second variant of the website is available for the purpose of A/B testing or multivariate testing and, further optionally, the instructions may provide criteria for the selection process enabling the requesting computer to perform the selection (e.g. the requesting computer may be provided with information on the number of available variants and statistical criteria or parameters such as parameters a, b and c mentioned above). Scripting language data in the sense of the invention may comprise data (such as e.g. JavaScript data including JavaScript instructions) which is processable by a browser means of the requesting computer 201 for post-processing of a webpage on the basis of markup language representation data and the instructions data.

In case the requesting computer 201 selects in step 205 the first website variant, the requesting computer 201 may directly continue with the step S206 of displaying the requested webpage of the website on the basis of the first markup language representation data (without post-processing that is connected to A/B testing or multivariate testing) in order to display the webpage according to the first variant (which may correspond to the version A of the website).

In FIG. 2, the provided scripting language data may further include instructions which instruct the requesting computer 201 to issue a webpage difference data request in case the second website variant is selected by the requesting computer 201. Accordingly, the requesting computer 201 issues the webpage difference data request to the web content management system 100 in step S207, if the second variant is selected. In case of multivariate testing, the webpage difference data request may further indicate which variant among the two or more alternative variants (being alternative variants to the first variant) shall be selected.

In the above-mentioned step 207, from the view point of the web content management system 100, the web content management system 100 receives the webpage difference data request, wherein creating second markup language representation data of the webpage (step S208) is then performed in response to receiving the webpage difference data request from the requesting computer 201 directed to the webpage.

The further steps S209, S210, S211, S212 and S213 in FIG. 2 correspond again to steps S108, S109, S111, S112 and S113 in FIG. 1. Here, it is to be noted that the first markup language representation data does not need to be sent again to the requesting computer 201 since the requesting computer 201 has been provided already with the first markup language representation data in step S202. Of course, the first markup language representation data is still needed at the web content management system 100 in the step S108 of determining the differences between the first and second markup representation data.

However, the web content management system may create the first markup language representation data again by means of a rendering means 130 on the basis of the first website variant or it may also conveniently retrieve the first markup language representation data from a memory means or storage means such as e.g. a cache memory 150. Of course, if the differences have been determined already before in connection with a previous request from another requesting computer 202 or 203, the steps S108 or S209 may be omitted and in steps S109 and S210, the difference date may be retrieved from a memory means or storage means such as e.g. a cache memory 150.

Figure 3:
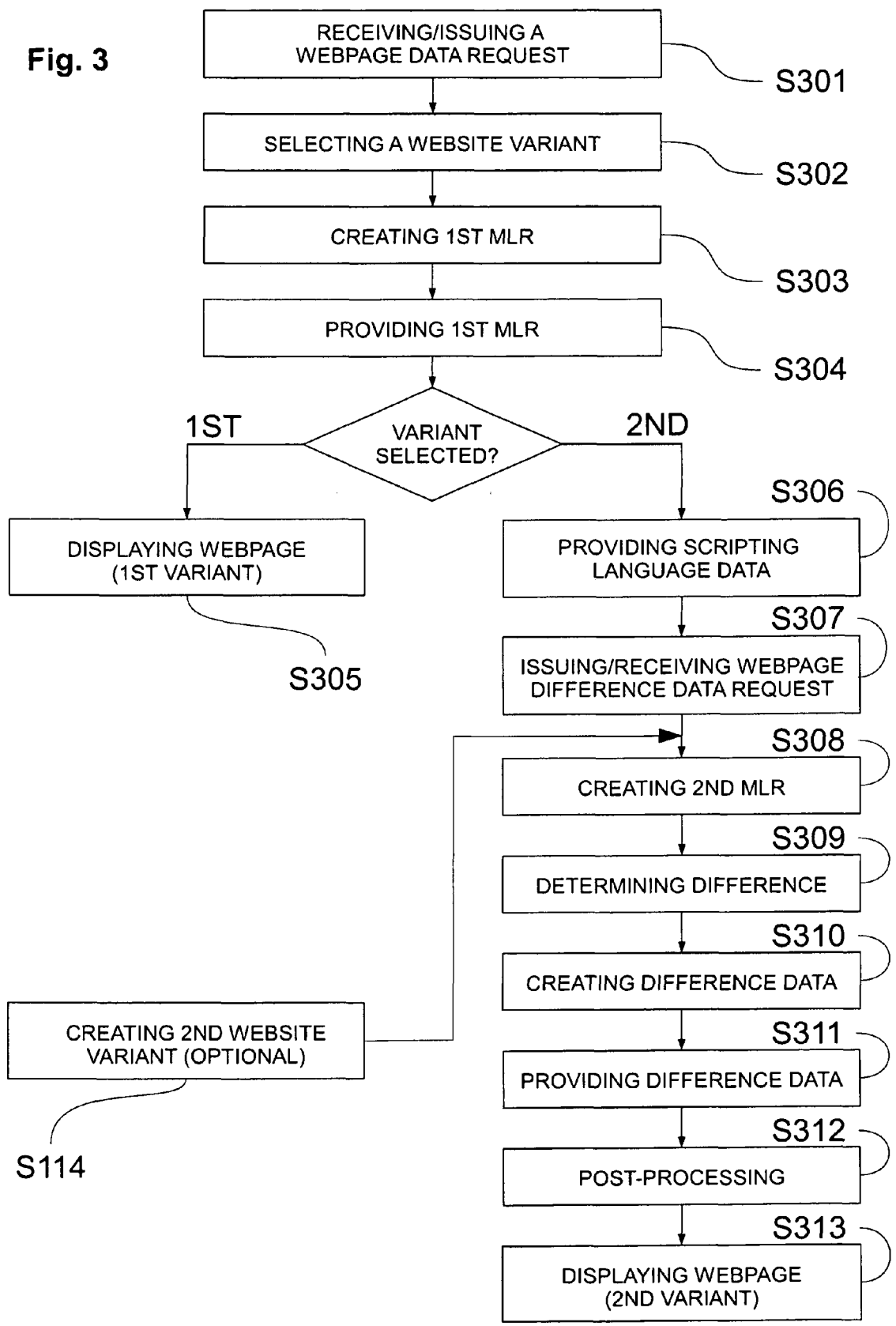
FIG. 3 exemplarily shows a flow chart illustrating a method for A/B testing or multivariate testing of websites on computers being connected to a web content management system according to a third embodiment of the present invention.

FIG. 3 exemplarily shows a flow chart illustrating a method for A/B testing or multivariate testing of websites on a computer 201 being connected to a web content management system 100 according to a third embodiment of the present invention.

As mentioned above, the method of FIG. 2 is particularly advantageous for implementations in which the selection of the website version to be displayed is performed at the requesting computer 201, while the method of FIG. 3 is particularly advantageous for implementations in which the selection of the website version to be displayed is performed at the web content management system 100. Specifically, according to the embodiment of FIG. 3, the web content management system 100 carries out the step S302 of selecting the website variant upon receiving the webpage data request from the requesting computer. Here, the step S302 is optionally carried out prior to the steps of creating the first markup language representation data (step S303) and the step of providing the requesting computer 201 with the first markup language representation data (step 304). However, it is also possible to carry out the selection step S302 after or between steps S303 and S304 according to further modifications of the method.

If the first variant has been selected in step S302, the web content management system ends the process and, accordingly, the requesting computer 201 which only has received the first markup language representation data in step S304 is continuing with the step of displaying the webpage on the basis of the first markup language representation data (step S305). On the other hand, if the first variant has been selected in step S302, the method continues with the steps S308, S309, S310, S311, S312 and S313 similar to steps S208 to S213 in FIG. 2 and similar to steps S107 to S109 and S111 to S113 of FIG. 1.

Optionally, the method further includes steps S306 and S307 similar to steps S204 and S207 in FIG. 2. Accordingly, the web content management system 100 may optionally provide the requesting computer 201 with scripting language data in step S306 including instructions for post-processing of the first markup language data which may include instructions to issue a webpage difference data request in step 307. Upon or in response to receiving the webpage difference data request in step S307, the web content management system 100 continues with the step S308 of creating the second markup language representation data.

The steps S308 and S309 may also be performed prior to receiving the webpage difference data request and then the web content management system 100 may provide the requesting computer 100 with the webpage difference data upon or in response to receiving the webpage difference data request. For example, the webpage difference data may be retrieved from a memory means or storage means such as e.g. a cache memory 150.

Figure 4:
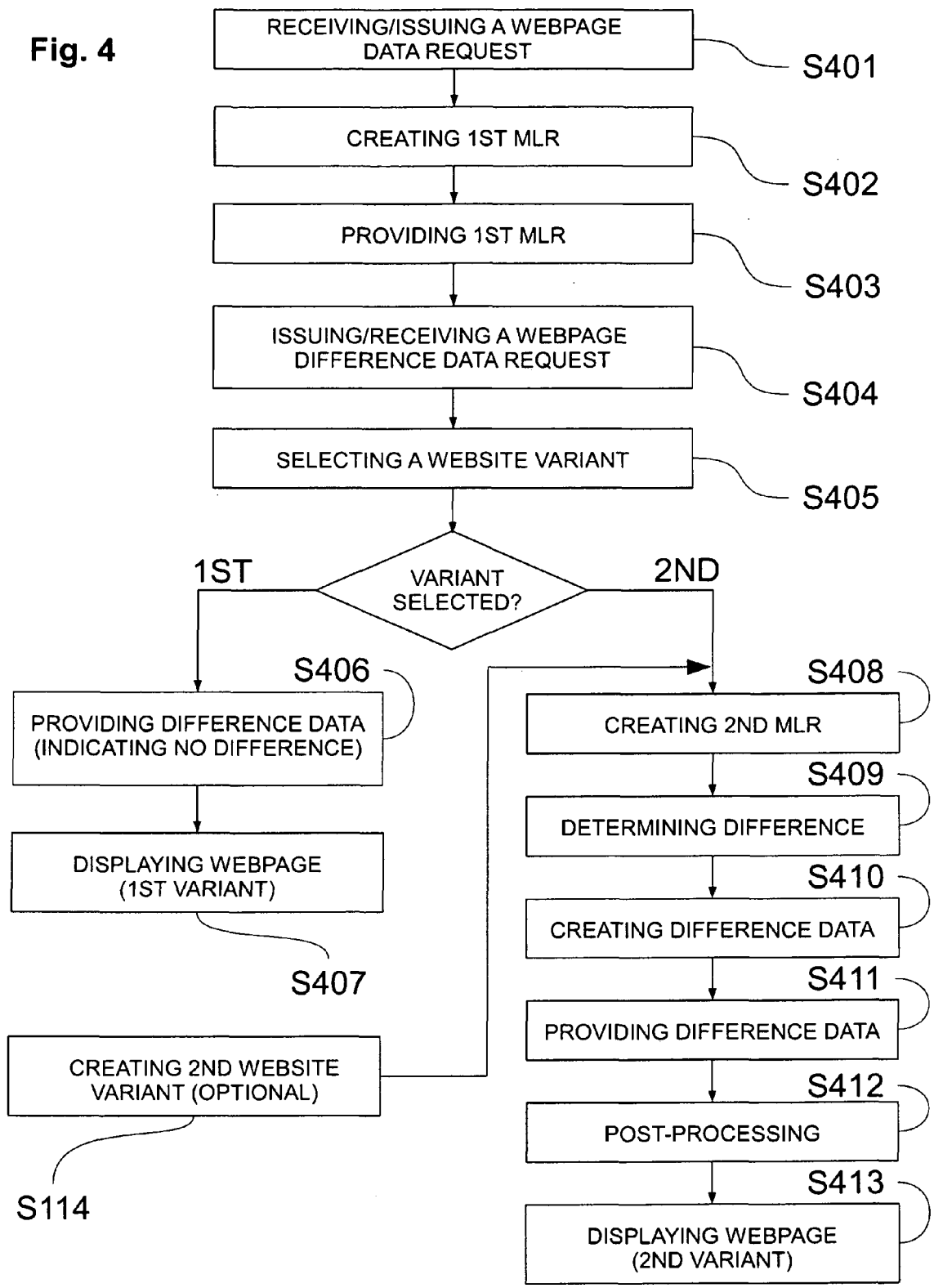
FIG. 4 exemplarily shows a flow chart illustrating a method for A/B testing or multivariate testing of websites on computers being connected to a web content management system according to a fourth embodiment of the present invention.

FIG. 4 exemplarily shows a flow chart illustrating a method for A/B testing or multivariate testing of websites on a computer 201 being connected to a web content management system 100 according to a fourth embodiment of the present invention.

The method of FIG. 4 is another method which is particularly advantageous for implementations in which the selection step S405 is performed at the web content management system 100 by means of a selecting means 130. Here, steps S401, S402 and S403 are similar to steps S101, S106 and S110 in FIG. 1, steps S201 to S203 in FIG. 2 and steps S301, S303 and S304 in FIG. 3.

However, in the step of providing the requesting computer 201 with first markup language representation data (step 403), the requesting computer may be additionally automatically provided with instructions to request webpage difference data even prior to the actual selection step S405 in which the website variant is selected. Then, in case the first variant is selected for which the first markup language representation data has already been provided in step S403, the web content management system 100 continues with a step of providing the requesting computer 201 with webpage difference data upon or in response to receiving the webpage difference data request in step S404. However, in this case the webpage difference data submitted to the requesting computer 201 indicates that there are no differences so that the requesting computer can continue with the step of displaying the webpage on the basis of the received first markup language (step S407, similar to steps S105 of FIG. 1, S206 of FIG. 2 and S305 of FIG. 3).

On the other hand, in case the second variant is selected in step S405, the web content management system 100 continues with steps S408, S409, S410, S411, S412 and S413 similar to steps S107 to S109 and S111 to S113 of FIG. 1, S208 to S213 in FIG. 2, and S308 to S313 of FIG. 3.

Figure 5:
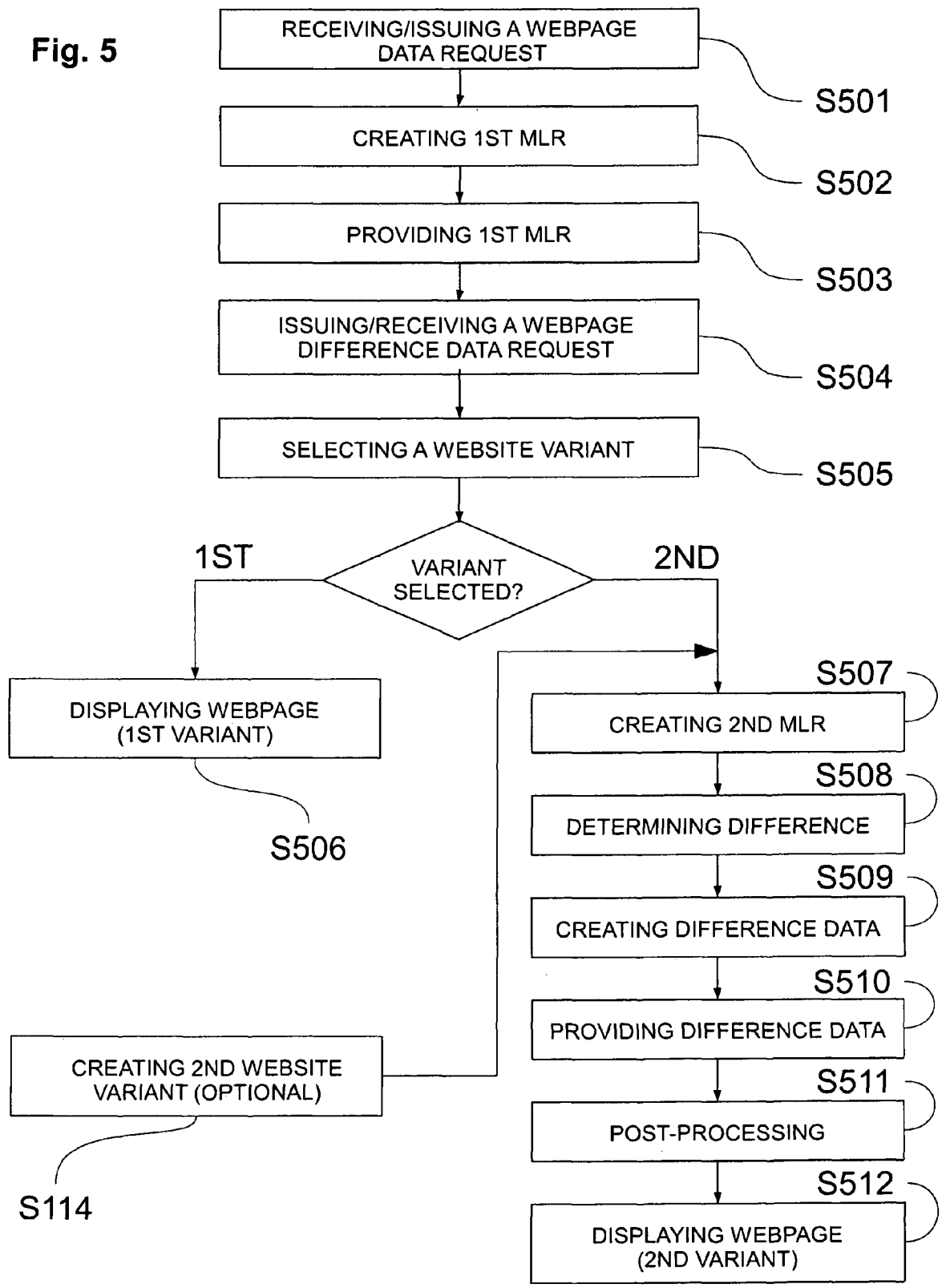
FIG. 5 exemplarily shows a flow chart illustrating a method for A/B testing or multivariate testing of websites on computers being connected to a web content management system according to a fifth embodiment of the present invention.

FIG. 5 exemplarily shows a flow chart illustrating a method for A/B testing or multivariate testing of websites on a computer 201 being connected to a web content management system 100 according to a fifth embodiment of the present invention.

The method of FIG. 5 is a slightly modified version of the method of FIG. 4 according to which the step of providing difference data that indicates that there are no differences (step S406 in FIG. 4) is left out. Accordingly, steps S510, S502, S503, S504, S505, S506, S507, S508, S509, S510, S511 and S512 correspond to steps S410 to S406 and S407 to S413 of FIG. 4. However, although the requesting computer 201 issues a webpage difference data request in step S504, it may already start displaying the webpage upon receiving the first markup representation data without waiting for the difference data (step S506).

Then, only if webpage difference data is received at the requesting computer 201 in a step S510, the requesting computer continues with steps S511 and S512. Accordingly, if the second variant is selected, the displayed webpage might change from the first version to the second version at the requesting computer. However, due to short submission and processing times, the user of the requesting computer 201 may still not actually recognize the change or at least be not significantly affected by the quickly occurring change.

Figure 6:
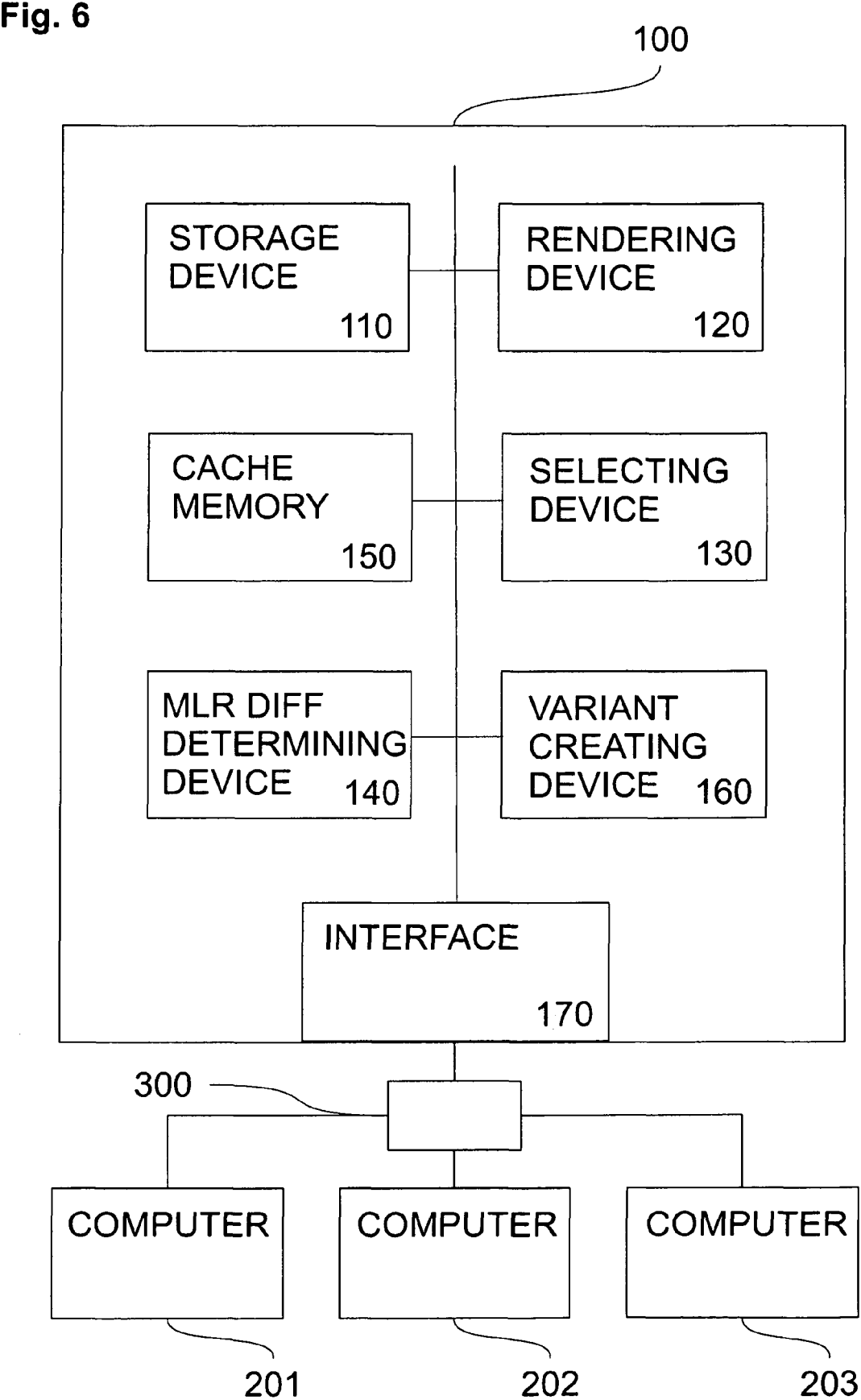
FIG. 6 exemplarily shows a schematic block diagram illustrating a web content management system configured for A/B testing or multivariate testing of websites on computers being connected to the web content management system according to a preferred embodiment of the present invention.

FIG. 6 exemplarily shows a schematic block diagram illustrating a web content management system 100 configured for A/B testing or multivariate testing of websites on computers 201, 202, 203 being connected to the web content management system 100 according to a preferred embodiment of the present invention. The web content management system 100 (which may be a system comprising one or more computers and/or one or more internet servers) is connected with an interface means 170 to computers 201, 202 and 203 in FIG. 6 via a network 300. The network 300 may be a wireless or wired computer network such as a WLAN, a LAN, the internet or any combination thereof.

The web content management system 100 is configured to carry out at least the method according to FIG. 1 (optionally additionally enabled to execute one or more of the methods according to FIGS. 2, 3, 4, and 5). Accordingly, the web content management system 100 comprises storage means 110 for storing website content data in the form of content objects and for storing one or more website variants and rendering means 120 for creating markup language representation data of one or more webpages of websites on the basis of a website variant and content objects indicated by the website variant.

The web content management system 100 further comprises markup language representation difference determining means 140 for determining differences between markup language representations of webpages and the interface means 170 for providing one or more of the requesting computers 201 to 203 with markup language representation data, scripting language data and/or webpage difference data. Also, via the interface means 170, the web content management system 100 may receive webpage data requests and/or webpage difference data requests. Optionally, the web content management system 100 may further comprise selecting means 130 for selecting one of the at least two website variants of the website.

The rendering means 120 is configured to create first and second markup language representation data of the webpage on the basis of the first and second website variants, respectively, and content objects indicated therein, and the differences between the first and second markup language representation data can then be determined by the markup difference determining means 140.

For performing the optional steps (such as S114 in FIG. 1) of creating the second website variant (or further third or fourth website variants), the web content management system 100 of FIG. 6 is optionally further provided with website variant creating means 160, which may be configured to create the second website variant (and optionally further variants) on the basis of the first website variant and the at least one difference between the first website variant and the second website variant (or other additional variants).

Accordingly, the second and other additional variants can be conveniently be defined on the basis of differences to the first variant at the object-oriented level. According to another aspect, the first website variant of the website and a plurality of differences between the first website variant and a third website variant may be stored in the storage means 110, and the website variant creating means 160 may be configured to create the second website variant automatically on the basis of the first website variant and a subset of differences of the plurality of stored differences between the first website variant and the third website variant.

In case a cache memory means 150 is provided as in FIG. 6, the web content management system 100 may further preferably be configured to automatically remove the first markup language representation data and/or the webpage difference data stored in the cache memory 150 of the web content management system 100, when one or more content objects indicated by the first website variant are changed (and/or when the webpage structure indicated by the first website variant is changed), and/or to automatically remove the second markup language representation data and/or the webpage difference data stored in the cache memory of the web content management system 100, when one or more content objects indicated by the second website variant are changed (and/or when the webpage structure indicated by the second website variant is changed).

The web content management system 100 may further preferably be configured to automatically remove from the cache memory 150 the first markup language representation data, the second markup language representation data and/or the webpage difference data stored in the cache memory of the web content management system, when one or more defined differences are changed.

In the following, a more explicit example is given for an exemplary implementation of the present invention.

The first variant of the webpage "Main Page" of a website may be stored as a content object in the storage means 110:

Content-Object "mainpage"
Title: "Main Page"
Contents: Reference to objects "Article1" and "Article2"
Colour scheme: "green"
Design: "first-article-full"

The therein referenced articles (which may be text objects or a combination of text objects such as title and article body, or even a combination of one or more text objects and one or more image objects, e.g. title, article body, image description of an image as text objects and the image as an image object) may be also stored as content objects in the storage means 110:

Content-Object "article1"
Title: "Dog bites man"
Text body: "On Feb. 14, 2011, a 32 year old man was bitten by a dog in front of the Hofbräuhaus in Munich."
Colour scheme: empty
Content-Object "article2"
Title: "Whale explodes on the street"
Text body: "In Taiwan, a whale did explode on the street. Unfortunately, the whale was not available for comments."
Colour scheme: empty On the basis of the above first variant and the therein indicated objects, the rendering means 120 could create the HTML data including three HTML files for three webpages: mainpage.html, article1.html and article2.html (as an example for first markup language data for a website including three web pages). Here, we exemplarily show the created data files mainpage.html and article1.html:

```
mainpage.html:
<html>
<head><title>Main Page</title></head>
<body class="green">
    <h1>Main Page</h1>
    <h2><a href="article1.html">Dog bites man</a></h2>
        <p>On February 14, 2011, a 32-year old man was bitten by a dog in front of the Hofbräuhaus in Munich.</p>
    <h2><a href="article2.html">Whale explodes on the street</a></h2>
</body>
</html>
article1.html:
<html>
<head><title>Dog bites man</title></head>
<body class="green">
<head><titel>Dog bites man</title></head>
<body >
    <h1>Dog bites man</h1>
    <p>On February 14, 2011, a 32-year old man was bitten by a dog in front of the Hofbräuhaus in Munich.</p>
</body>
<html>
```

Now, the differences could be for example defined at the object-oriented level, e.g. such as the following three defined differences (a second variant could then be created automatically on the first variant and the defined differences for rendering of the second markup language representation data or alternatively the second markup language representation data may be created on the basis of the defined differences and the first variant, the second variant could then be represented by the group of the first variant and the defined differences):

"mainpage": Design: "first-article-full"->"only-summaries"
"article1": Title: "Dog bites man"->"Did the man bite the dog?"
"artikle1": Colour scheme: "green"->"red"

On the basis of the second variant and the therein indicated objects, the rendering means 120 could create the alternative HTML data including three HTML files for the three webpages: mainpage.html, article1.html and article2.html (as an example for second markup language data for a website including three web pages). Here, we exemplarily show the created data files mainpage.html and article1.html:

```
mainpage.html:
<html>
<head><title>Main Page</title></head>
<body class="green">
    <h1>Startseite</h1>
    <img src="advertisement.png"/>
    <h2><a href="article1.html">Did the man bite the dog?</a></h2>
    <h2><a href="article2.html">Whale explodes on the street</a></h2>
</body>
</html>
article1.html:
<html>
<head><title>Did the man bite the dog?</title></head>
<body class="red">
    <h1>Did the man bite the dog?</h1>
    <p>On February 14, 2011, a 32-year old man was bitten by a dog in front of the Hofbräuhaus in Munich.</p>
</body>
</html>
```

In the above, the following non-trivial effects can be derived:

A difference that is only defined once (e.g. "Dog bites man"->"Did the man bite the dog?") is automatically and consistently performed on different webpages of the website (e.g. on mainpage.html and on article1.html). This is a huge advantage compared to methods which define the differences at the markup language representation level such as the HTML level, where the changes had to be performed for each webpage independently.

At the same time, the changes may be made plural times on one webpage although being defined only once.

Moreover, even small changes at the object-oriented level may lead to significant differences at the markup language representation level (e.g. here, in the above example, by the small change of the applied design criteria "first-article-full"->"only-summaries", not only is the text body of the first article removed from the mainpage-html, but in addition an advertisement image object is automatically added).

There may be implemented complex algorithms during the process of creating the markup language representation data. In the above example, in article1.html of the first version, the colour scheme of the main page is automatically used, but in the second version, the defined colour scheme is used.

In addition, in the above, there have been defined three differences which can also be applied automatically independently or in other combinations leading to a possible seven additional versions in addition to the version A.

Summarizing the above, the present invention provides efficient and reliable configurations enabling a functionality of A/B testing or multivariate testing of websites on computers being connected to an object-oriented web content management system and object-oriented web content management systems which efficiently and reliably provide such a functionality of A/B testing or multivariate testing of websites on computers being connected to the web content management system.

Features, components and specific details of the above-described embodiments of the present invention may be exchanged or combined to form further preferred embodiments optimized for the respective application. As far as those modifications are readily apparent for an expert skilled in the art, they shall be disclosed implicitly by the above description without specifying explicitly every possible combination, for the sake of conciseness of the to the web content management system.

The invention claimed is:

1. Method for A/B testing or multivariate testing of a website on a computer being connected to a web content management system, comprising:
    storing, at the web content management system, website content data in the form of stored content objects and one or more website variants, wherein each of the one or more stored website variants represents data that defines a structure of one or more webpages of the website on the basis of said stored content objects,
    creating, at the web content management system, markup language representation data of one or more webpages on the basis of at least one of the stored website variants and the stored content objects indicated by said at least one of the stored website variants,
    receiving, at the web content management system from a requesting computer, a webpage data request directed to at least one webpage of the website for which at least two website variants including a first website variant and a second website variant are defined, and
    selecting one website variant of the at least two website variants of the website;
    wherein:
    if the first website variant is selected, the method further comprises:
    creating, at the web content management system, first markup language representation data of the at least one webpage on the basis of the first website variant and the content objects indicated by the first website variant, and
    providing the requesting computer with the first markup language representation data of the webpage; and
    if the second website variant is selected, the method further comprises:
    creating, at the web content management system, first markup language representation data of the at least one webpage on the basis of the first website variant and the content objects indicated by the first website variant,
    creating, at the web content management system, second markup language representation data of the at least one webpage on the basis of the second website variant of the website and the content objects indicated by the second website variant,
    determining, at the web content management system, differences between the created first and second markup language representations of the at least one webpage,
    creating, at the web content management system, webpage difference data on the basis of the determined differences, the created webpage difference data indicating the differences between the first and second markup language representation data of the at least one webpage,
    providing the requesting computer with the first markup language representation data of the at least one webpage, and
    providing the requesting computer with the created webpage difference data for post-processing of the first markup language representation at the requesting computer on the basis of the webpage difference data.

2. Method according to claim 1, wherein
    if the first website variant is selected, the method further comprises displaying the at least one webpage corresponding to the first markup language representation data on the basis of the first markup language representation data; and
    if the second website variant is selected, the method further comprises displaying the at least one webpage corresponding to the second markup language representation data on the basis of the first markup language representation data being post-processed on the basis of the webpage difference data.

3. Method according to claim 1, wherein the step of selecting one of the at least two website variants of the website is performed at the web content management system,
    wherein selecting one website variant of the at least two website variants of the website is performed in response to receiving the webpage data request or
    in response to receiving a webpage difference data request.

4. Method according to claim 1, further comprising:
    providing the requesting computer with scripting language data comprising instructions for post-processing of the first markup language representation data at the requesting computer, the instructions including an instruction to request webpage difference data,
    wherein creating second markup language representation data of the webpage is performed in response to receiving a webpage difference data request directed to the at least one webpage.

5. Method according to claim 4, wherein
    if the first website variant is selected, the method further comprises:
    providing, upon receiving from the requesting computer the webpage difference data request, the requesting computer with webpage difference data indicating that no post-processing of the first markup language representation is required.

6. Method according to claim 4, wherein
    if the second website variant is selected, providing the requesting computer with the created webpage difference data that indicates the differences between the first and second markup language representation data of the at least one webpage is performed in response to receiving the webpage difference data request.

7. Method according to claim 1, wherein
    the step of selecting one of the at least two website variants of the website is performed at the requesting computer; and
    if the second website variant is selected, the method further comprises:
    issuing, at the requesting computer, a webpage difference data request directed to the second website variant,
    wherein providing the requesting computer with the created webpage difference data that indicates the differences between the first and second markup language representation data of the at least one webpage is performed in response to receiving from the requesting computer the webpage difference data request directed to the second website variant.

8. Method according to claim 1, further comprising:
    storing the first website variant and the second website variant of the website; or storing the first website variant of the website and variant difference data indicating at least one difference between the first website variant and the second website variant, and, if the second website variant is selected, the second website variant is created on the basis of the first website variant and the at least one difference between the first website variant and the second website variant.

9. Method according to claim 8, wherein the at least two website variants further include a third and a fourth website variants, and the method further comprises:

storing variant difference data that indicates at least one difference between the first website variant and the third website variant, creating the third website variant on the basis of the first website variant and the at least one difference between the first website variant and the third website variant, and creating the fourth website variant on the basis of the first website variant, the at least one difference between the first website variant and the third website variant, and at least one difference between the first website variant and the second website variant.

10. Method according to claim 1, further comprising:

storing the first website variant of the website and a plurality of differences between the first website variant and a third website variant, and creating the second website variant on the basis of the first website variant and a subset of differences of the plurality of stored differences between the first website variant and the third website variant.

11. Method according to claim 10, wherein, if the second website variant is selected, the one or more differences included in the subset are selected in response to receiving from a requesting computer a request directed to the at least one webpage.

12. Method according to claim 1, further comprising:

storing the first markup language representation data, the second markup language representation data, the created webpage difference data, and/or scripting language data in a cache memory of the web content management system.

13. Method according to claim 12, further comprising:

removing the first markup language representation data, the webpage difference data and/or scripting language data stored in the cache memory of the web content management system, when one or more content objects indicated by the first website variant are changed;

removing the second markup language representation data, the webpage difference data and/or scripting language data stored in the cache memory of the web content management system, when one or more content objects indicated by the second website variant are changed; and/or removing the first markup language representation data, the second markup language representation data, the webpage difference data and/or scripting language data stored in the cache memory of the web content management system, when one or more defined differences are changed.

14. Method according to claim 1, wherein in selecting one website variant, upon receiving a request directed to the webpage from the requesting computer within a predetermined time period after having received already an earlier request directed to the webpage from the requesting computer, the same website variant is selected as having been selected upon receiving the earlier request.

15. Web content management system configured to manage A/B testing or multivariate testing of a website on a computer being connected to the web content management system, the web content management system comprising:

a storage device configured to store website content data in the form of stored content objects and to store one or more website variants, wherein each of the one or more stored website variants represents data that defines a structure of one or more webpages of the website on the basis of said stored content objects, and one or more processors configured to execute creating markup language representation data of one or more webpages on the basis of at least one of the stored website variants and the content objects indicated by said at least one of the stored website variants, and determining differences between markup language representations of the one or more webpages;

wherein the web content management system is configured to receive, from a requesting computer connected to the web content management system, a webpage data request directed to at least one webpage of the website for which at least two website variants including a first website variant and a second website variant are defined, wherein:

if the first website variant is selected at the requesting computer or at the web content management system, the one or more processor of the web content management system are configured to:

create first markup language representation data of at least one webpage on the basis of the first website variant and the content objects indicated by the first website variant, and provide the requesting computer with the first markup language representation data of the at least one webpage; and if the second website variant is selected at the requesting computer or at the web content management system, the one or more processors of the web content management are configured to:

create first markup language representation data of the at least one webpage on the basis of the first website variant and the content objects indicated by the first website variant, create second markup language representation data of the at least one webpage on the basis of the second website variant of the website and the content objects indicated by the second website variant, determine differences between the created first and second markup language representations of the at least one webpage, create webpage difference data on the basis of the determined differences, the created webpage difference data indicating the differences between the first and second markup language representation data of the at least one webpage, and provide the requesting computer with the first markup language representation data of the at least one webpage and with the created webpage difference data for post-processing of the first markup language representation at the requesting computer on the basis of the webpage difference data.

* * * * *